Oct. 17, 1961     J. B. HINSON     3,005,103
PHOSPHORS
Filed Nov. 12, 1957
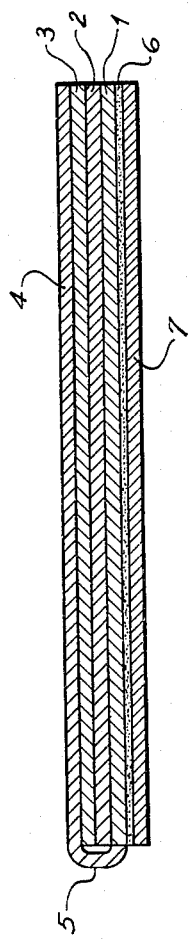
INVENTOR.
JAY B. HINSON
BY Edward Thomas
ATTORNEY

United States Patent Office 3,005,103
Patented Oct. 17, 1961

3,005,103
PHOSPHORS
Jay B. Hinson, The Ridge, Hartsdale, N.Y.
Filed Nov. 12, 1957, Ser. No. 696,306
2 Claims. (Cl. 250—80)

This invention relates to phosphors and fluorescent materials and to sheets and structures carrying phosphors and fluorescent materials and is herein illustrated in some detail as embodied in coated flexible sheets of aluminum foil carrying the efficient phosphors of calcium and strontium.

Phosphor-bearing surfaces hold out the promise of great usefulness, of which one extreme example is the need for providing some light in the artificially-lighted plate-enclosed engine room of a large ocean vessel, so that enough light is provided to guide the working personnel to safety in case of total break-down of power.

Specifications defining the needed light have been published by the United States Government under index No. MIL–L–3891, June 5, 1953, but no commercially available product meets the conditions laid down either in those specifications or modifications of them. Either the luminosity is too transitory or the material is too sensitive to weather conditions, or the material is unsatisfactory for both reasons, as seems to have been generally, if not, always true.

It has hitherto been supposed that the desired luminosity was to be obtainable only by producing the phosphors in the form of coarser granules, but hitherto the larger granules have proved too fragile to ship commercially and even too fragile to mix into liquids and apply to a surface when suspended in the liquid carrier.

According to the present invention the size of the granules may be an unimportant or even a non-existent factor, and the desired increase in luminosity is secured by the nature of the support carrying the phosphors and by the nature of the binder holding them and by the procedures of coating.

In the form of the invention described in some detail the phosphors are carried on a backing of highly reflective metal such as practically chemically clean aluminum foil almost free from oxides.

The aluminum foil seems most effective as a reflector for phosphors when its surface is extremely irregular microscopically, as when covered with relatively deep closely set scratches and irregularities. Highly reflective continuous sheet metal such as clean polished aluminum, stainless steel, chromium, and nickel are all apparently superior to the white surface hitherto recommended.

The phosphor granules, however, are kept free of actual contact with the metal surface thus permitting the reflecting surface to reflect frontwardly light generated at the back of the phosphor granules, and also inhibiting any chemical reaction between the phosphors and the foil.

To effect these and other ends the reflecting metal backing is covered with a foundation protective layer, perhaps one-thousandth of an inch thick of synthetic resin. Much the best resin for thus coating flexible aluminum seems to be a very soft and elastic acrylic ester resin applied in solution and dried, but with a slight tack at room temperatures.

Over this is applied a liquid suspension of the phosphors carried in a solution of somewhat harder yet permanently flexible soft grade of acrylic ester resin. This phosphor-bearing suspension seems to work best when too thick to permit settling or stratifying of the phosphors, carrying often 40% of the phosphors instead of the 10% hitherto recommended.

The solvent preferably carries a mixture of varied organic diluents such that the liquids are successively more volatile to yield a suitable coating when all are evaporated. The dried layer of resinbound phosphors is preferably of the order of 0.008 inch thick. If over 0.012 inch thick it is more likely to scale off when the thin film of aluminum backing is sharply bent.

When this phosphor-bearing layer is dry it is preferably covered with a sealing coat of acrylic ester resin, known as a "general purpose resin," forming a semiflexible nontacky film about 0.001 inch thick.

The aluminum foil or other flexible reflecting surface is usually coated on its back with a commercial pressure sensitive adhesive which readily adheres to almost any supporting surface and never hardens or cracks, but can be stripped from the supporting surface.

For shipping purposes the adhesive is generally protected by temporary strippable cover sheet so that it will not adhere to anything it may touch.

Other features and advantages will hereinafter appear.

Example

A soft polished aluminum foil 0.005 inch thick was burned free from the grease usually used in its manufacture, polished to remove from both faces all foreign matter, especially adhering oxide, scratched while clean with relatively deep visible scratches close together but irregular, and sealed up to exclude air and moisture until just before coating it. The almost chemically clean foil was foundation coated with a solution of the softest grade, permanently flexible, commercial acrylic ester resin supplied as 40% solids carried in toluol, after the solution had been thinned so as to carry 28% solid resin, 57% toluol, xylol 7½% and methyl isobutyl ketone 7½%, all by volume. Du Pont Lucite resin of corresponding softness was equally satisfactory. The C–10–LV resin dried with a slight tack at room temperature.

This solution was not found very satisfactory for spraying but was satisfactory when brushed on or roller coated. The proportions given here and below are not critical but have proved optimum.

The resin was found not to crack when the aluminum foil was abused, even by folding. The resin coating worked well on rigid surfaces of aluminum and many other materials, and could be much thicker on the rigid surfaces, if desired.

On this coated foil was spread a solution of acrylic ester rein, carrying the desired phosphor material.

The same resin solution, C–10–LV, was diluted to carry 32% resin solids, 58% toluol, 5% xylol, and 5% methyl isobutyl ketone.

This diluted solution was mixed with dry pigments in the proportion of 60% of solution, 40% dry pigments, into a medium to light paste form, preferably handmixed slowly or mechanically mixed at slow speed without grinding.

Such mixing is suitable for many phosphors including the sulfides of calcium, strontium and zinc.

The phosphor-bearing solution was stipple brushed on, or roller coated, or flowed and knife spread, but not satisfactorily sprayed on.

It was found that the phosphor particles were kept clear of contact with the aluminum by the foundation acrylic coating.

The maximum efficiency seems to be obtained when the dried coating of mixed resin carrying phosphor particles form a coating of about 0.008 to 0.009 inch thick.

The resin used under the code name C–10–LV was a forty percent solution in toluene of acrylic ester polymer widely sold under that name. Commercial methods for the preparation of acrylic ester (indexed under resin) are set forth on pages 918, 919 of Organic Chemistry by Fieser and Fieser, Heath, 1944, and their polymerization procedures and products are described on pages 919, 920. The text states the nature of the polymer chain linkage is still unknown. The 1956 edition of the same book summarizes the same data in other words saying they "polymerize much as other vinyl monomers do," see pages 876, 877.

It was found possible to replace the acrylic resin of the phosphor-bearing coating with a mixture of half the weight of the same resin C–10–LV plus the same half weight of a general purpose tougher and somewhat harder acrylic ester resin known as a general purpose B–72 acryloid, Rohm and Haas, both carried as 40% by volume solution in toluol, thinned to carry 16% soft resin solids, 16% tough resin solids, 58% toluol, 5% xylol, and 5% methyl isobutyl ketone, all by volume.

This mixed resin coating is slightly less flexible but gives better weathering by about 5%.

Over a foil carrying either of these phosphor-bearing coatings was spread, preferably by spraying, a sealing coat preferably consisting of a solution of the last-named B–72 resin acryloid thinned to carry 24% harder resin solids, 56% toluol, 10% xylol, and 10% methyl isobutyl ketone. This dried to a non-tacky coating.

The aluminum foil usually carries coated on its back a pressure sensitive adhesive adapted to adhere to almost any support to hold the aluminum to it, and the adhesive is usually provided with a strippable protective covering so that temporarily the coated aluminum can be handled without adhering to anything.

Both the pressure sensitive adhesive and the strippable covering may be any of numerous commercial forms of each. The most efficient phosphors available commercially consist of about 80% calcium sulfide and 20% strontium sulfide yielding a blue light, but the above described coatings are adapted to be used to obtain increased efficiency of phosphor glow brilliancy and phosphor glow persistence of numerous other commercial phosphors such as zinc sulfide, and also of commercial fluorescent powders.

The efficiency of two commercial calcium-strontium blue-yielding phosphors applied and coated according to the present invention is shown by the following comparison.

|  | Light value at two minutes in microlamberts | After weathering | Percent decrease by weathering |
| --- | --- | --- | --- |
| First product | 26 | 16.12 | 36 |
| Second product | 26 | 14.34 | 41 |
| Equally mixed | 26 | 14.34 | 41 |

The above tests were conducted according to U.S. Military Specification MIL–L–3891, which called for "weathering" by a standard salt-spray intermittent over 80 hours.

The foregoing tests compare with low initial brightness (modified to types I and II) of 20 and 25 microlamberts, respectively, and after 80 hours of the salt-spray test the brightness of 14.34 microlamberts far exceeded the specification brightness required even at the end of thirty minutes of 2.4 and 3.0 microlamberts.

It was found that the coatings above described provided a weatherproof cut edge if the coated aluminum film was severed as by a knife or pair of shears, whereas such severing of coated phosphor prior films destroyed their weatherproof properties, apparently by capillary action.

Other types of resins similarly applied in special coatings may be useful but fail to provide both resistance to weathering and the permanent transparency of the acrylic ester resins.

Vinyl resins deteriorate on weathering and outer coats fail to adhere satisfactorily at times to undercoats forming separable layers.

Styrene resins at times harden in layers in films and tend to become brittle and are inferior in often flaking off when in thin films that are bent.

Cellulose acetate films are of inferior clarity and lack equally permanent flexibility.

The solvent toluol and the thinners xylol and methyl isobutyl ketone are the most satisfactory ordinarily.

Under some conditions it may be preferable to work with slightly modified proportions of methyl ethyl ketone, ethyl acetate, Cellosolve, cyclohexanone and analogous organic volatile liquids, such as high flash naphthas and butyl acetates.

Reflecting metals have been named above, but more expensive ones, such as rhodium, are available.

For special purposes, other metals, such as clean polished copper, may serve best, if aluminized.

In the accompanying drawing is shown an enormously exaggerated cross-section of a sheet of the present invention in which the aluminum base foil 1, carries a base or protective coating of acrylic ester 2. On the coating 2 lies the phosphor material 3 in the form of granules bound by acrylic ester resin. Over the phosphor coating 3 lies the sealing coat 4 of acrylic ester resin, shown as bent down to lie against the aluminum 1 at 5 where the sheet has been cut.

On the back of the aluminum sheet 1 lies the pressure sensitive adhesive 6 covered by the protective strippable layer 7.

It has been found that a quarter inch wide strip of aluminum foil carrying the described coating of calcium and strontium sulfides of about 320 mesh provides adequate lighting to guide on in approaching a doorway in total darkness. It has also been found that such strips serve well to guide to wall electric switches by covering the usual cover plates with such strips.

A similar coated strip carying zinc sulfide gives a brighter greenish light but transitory, lasting only two hours or so, whereas the calcium and strontium sulfide coating gives highly useful brightness for more than two days of 24 hours and more.

The calcium and strontium sulfide coated strip of the same width has also served well to mark the sides of stairways and the edges of stair treads, and the stair risers.

Such a strip on the edge of a door warns the person approaching it, when the door is ajar, to beware of hitting the partly open door.

The foregoing all result from ordinary house lighting.

This application is a continuation-in-part of my patent application for phosphors, executed October 30, 1957 and filed November 1, 1957, Ser. No. 693,863, now abandoned.

Having thus described certain embodiments of the invention, what is claimed is:

1. A light yielding phosphor-bearing sheet, consisting of a layer of sulfur-bearing phosphor particles adapted to absorb radiation and later emit light rays, carried in a permanently flexible resin, a cover for said layer consisting of a harder acrylic resin adapted to resist wear, a continuous aluminum foil sheet on which the phosphor-bearing layer is carried, and a continuous permanently flexible layer consisting of acrylic resin separating the phosphor-bearing layer from the aluminum and permanently inhibiting chemical reaction between the phosphor and the foil.

2. A light yielding phosphor bearing sheet consisting of a layer of fine sulfur-bearing phosphor particles about 0.008 to 0.012 inch thick carried in a layer consisting of a permanently flexible acrylic resin, and adapted to absorb radiation and later emit light, a cover for said layer consisting of a harder acrylic resin adapted to resist wear, a continuous aluminum foil sheet about 0.005 inch thick, in which the phosphor-bearing layer is carried, and a continuous layer consisting of permanently flexible acrylic resin separating the phosphor-bearing layer from the aluminum nad permanently inhibiting chemical reaction between the phosphor and the foil.

References Cited in the file of this patent

UNITED STATES PATENTS

| | | |
|---|---|---|
| 1,346,360 | White | July 13, 1920 |
| 2,188,264 | Fordyce | Jan. 23, 1940 |
| 2,275,290 | Dreyer | Mar. 3, 1942 |
| 2,828,435 | Hoyt | Mar. 25, 1958 |

FOREIGN PATENTS

| | | |
|---|---|---|
| 283,599 | Germany | Apr. 20, 1915 |

OTHER REFERENCES

"An Introduction to Luminescence of Solids," H. V. Leverenz, Wiley & Sons, 1950, pp. 407 to 411.